(12) United States Patent
Pederson

(10) Patent No.: US 7,007,634 B1
(45) Date of Patent: Mar. 7, 2006

(54) AUTOMATED LIVESTOCK TROUGH

(76) Inventor: Les Pederson, 1573 C Ave., Dakota City, NE (US) 68731

( * ) Notice: Subject to any disclaimer, the term of this patent is extended or adjusted under 35 U.S.C. 154(b) by 0 days.

(21) Appl. No.: 10/876,388

(22) Filed: Jun. 25, 2004

(51) Int. Cl.
*A01K 7/04* (2006.01)

(52) U.S. Cl. ........................................ 119/78

(58) Field of Classification Search ............ 119/51.01, 119/51.5, 69.5, 72, 78, 79, 80, 74
See application file for complete search history.

(56) References Cited

U.S. PATENT DOCUMENTS

| | | | |
|---|---|---|---|
| 3,306,263 A * | 2/1967 | Johnson | 119/73 |
| 3,610,206 A * | 10/1971 | Davis | 119/78 |
| 4,470,371 A * | 9/1984 | Strickland | 119/78 |
| 4,883,022 A * | 11/1989 | Barker | 119/73 |
| 4,962,730 A * | 10/1990 | Schafer | 119/73 |
| 5,052,343 A * | 10/1991 | Sushelnitski | 119/78 |
| 5,105,771 A * | 4/1992 | Schafer | 119/73 |
| 5,394,899 A * | 3/1995 | Powers | 137/430 |

* cited by examiner

*Primary Examiner*—T. Nguyen
(74) *Attorney, Agent, or Firm*—Thomte, Mazour & Niebergall; Shane M. Niebergall

(57) ABSTRACT

An automated watering trough is provided with a fluid supply line that automatically fills the trough to a desired volume through the use of a valve and actuator. A protective housing may be provided to substantially encase the valve and actuator, along with an optional overflow conduit, to reduce the incidence of contact between livestock and the automation components. The shell of the trough may be comprised of a recycled tire provided with a base plug, which may support the protective tower and automation components.

19 Claims, 4 Drawing Sheets

AUTOMATED LIVESTOCK TROUGH

BACKGROUND OF THE INVENTION

1. Field of the Invention

The present invention relates to troughs for use in watering livestock, and more particularly to a trough that automatically maintains a selected volume of water and substantially resists damage to its operative components by livestock.

2. Description of the Prior Art

Watering troughs are widely used by livestock producers who raise their livestock in grazing paddocks that do not have natural water sources such as streams or ponds. The use of water troughs is also frequently used for the exclusion of livestock from natural bodies of water. Some water troughs take the form of a simple holding tank that is placed in the pasture and must be manually filled with water that is brought to the trough from a remote source. Some troughs are positioned adjacent to a water source that must be manually actuated, such as a hand pump that is coupled with a well. However, the manual labor required to deliver water to the troughs expends valuable time and, depending on the location of the trough, can be a significant inconvenience.

Prior art methods have attempted to automate livestock watering systems. However, those attempts typically resulted in watering troughs that were either too complex and costly to operate or troughs that repeatedly failed to perform their automated function. Oftentimes, the failure of an automated water trough is due to component damage caused by livestock or the elements. As livestock repeatedly come into contact with water supply lines, valves and other such structures, the automated system invariably becomes damaged and fails over time. Harsh winters and dry, hot summers will also wear down component systems, if not causing them to fail suddenly.

Accordingly, what is needed is an automated watering system for livestock that is comprised of structural components that resist the damaging effects that livestock and the elements can have on such systems. However, such an automated watering system should also be flexible in use as well as simple and inexpensive to manufacture.

SUMMARY OF THE INVENTION

The watering trough of the present invention is generally provided with an automated water supply system that maintains a desired volume of water for watering livestock throughout the year. The trough is provided with a base and an outer wall that extends upwardly from a peripheral edge of the base to form an open cavity for holding the water. A fluid supply conduit is positioned to deliver the water to the cavity. In one preferred embodiment, the fluid supply conduit extends beneath the ground surface from a water source and enters the trough through its base. A valve and valve actuator are coupled to the fluid supply conduit and adjusted to permit the flow of water into the cavity until a desired volume is reached, at which time the flow of water is terminated.

A preferred embodiment of the trough incorporates an inner wall that at least partially surrounds the valve and valve actuator to substantially limit the incidence of contact between the components and the livestock. The inner wall may be shaped to form a protective tower, which surrounds the valve and valve actuator. An overflow conduit may also be positioned within the protective tower to disperse excess water in the event that the valve actuator fails to terminate the flow of water. To further reduce the incidence of contact between the components and the livestock, the protective tower may extend upwardly from the base of the water trough at a point approximating the center of the trough.

Another preferred embodiment fabricates the base and wall of the trough from a portion of a recycled over-the-road tire. A plug is fashioned to seal the bottom opening of the tire, and the protective tower is positioned to extend upwardly from the plug. Such a "tire trough" may be easily incorporated with a heat sink to reduce the chances of the water freezing during the winter.

It is therefore one of the principal objects of the present invention to provide an automated watering trough that substantially prevents damage to the automation components and water supply by livestock using the trough.

A further object of the present invention is to provide an automated watering trough that substantially prevents damage to the automation components from the weather and other natural elements.

Yet another object of the present invention is to provide an automated watering trough that makes a substantial use of recycled products during its construction.

Still another object of the present invention is to provide an automated watering trough that is relatively simple in construction.

Yet another object of the present invention is to provide an automated watering trough that is easily adapted for a plurality of uses in different settings and environments.

A further object of the present invention is to provide an automated watering trough that is easy to use and maintain.

These and other objects of the present invention will be clear to those of skill in the art.

DESCRIPTION OF THE PREFERRED EMBODIMENT

Figure 1:
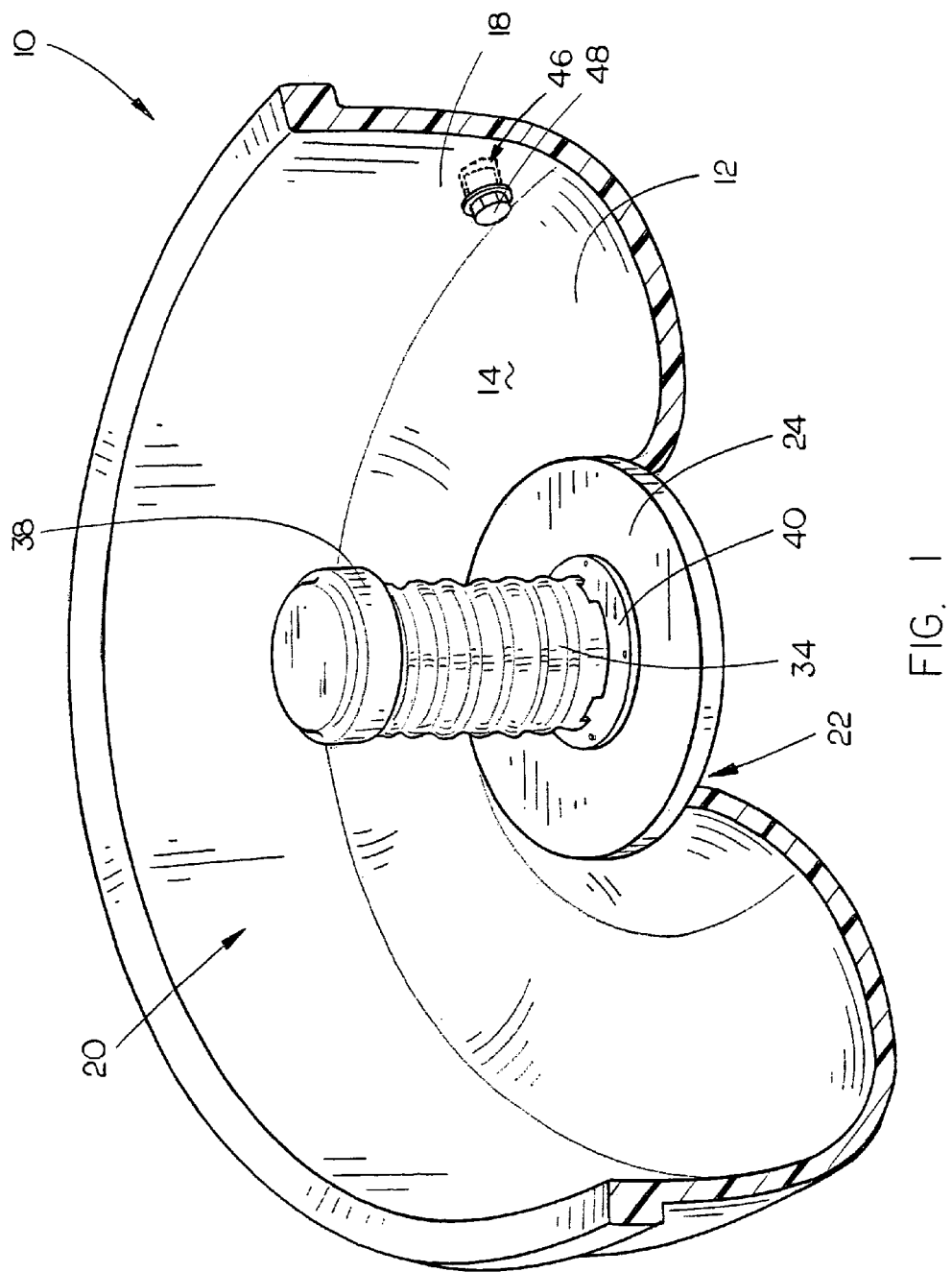
FIG. 1 is an isometric cut-away view of one embodiment of the automated trough of the present invention.

The livestock trough 10 of the present invention is generally depicted in FIGS. 1–4. The trough 10 is provided with a base 12 having an upper surface 14 and a lower surface 16. A wall 18 extends upwardly from the peripheral edge portion of the base 12 to form an open cavity 20. It is contemplated that the base 12 and wall 18 could be formed from nearly any material, so long as the material is suitable for extended periods of contact with water. For example, the trough could be formed from metal, such as the ubiquitous round or ovular metal water troughs that are frequently used for watering livestock. The shape of the trough is relatively unimportant and may be configured to fit any particular application. It is preferred, however, that the trough be sized and shaped to support a sufficient volume of water to support the livestock for which it is intended.

In a preferred embodiment, the trough is comprised of a recycled over-the-road tire having one of its sidewalls removed. When positioned in a generally horizontal fashion, the base 12 of the trough will be comprised of the remaining side wall, and the wall 18 will be comprised of the tread. In this position, however, the base will have an inner edge portion that defines a large opening 22 in the base 12. A plug 24 must be used to seal the opening 22 so that the trough 10 will hold a desirable volume of fluid. It is contemplated that the plug 24 could be comprised of nearly any material, such as rubber, metal or concrete. However, in a preferred embodiment, the plug 24 is comprised of a plastic, such as polyethylene or other similar material.

A fluid supply conduit 26 should be positioned in selective fluid communication with the cavity 20 to supply the desired volume of water. It is contemplated that the source of the water could be a neighboring body of water, a well or the like. It is further contemplated that the method of delivering the water through the fluid supply conduit 26 could be one of many known methods, including gravity systems, electric pumps, solar-powered pumps, sling pumps, etc. In a preferred embodiment, the fluid supply conduit 26 extends upwardly through an opening 28 in the plug 24 so that it is positioned at least partially within the cavity 20. It is contemplated, however, that a similar opening could be formed in virtually any other location in the trough, such as the base 12 or the wall 18 through which the fluid supply conduit 26 could be run. Location of the fluid supply conduit 26 through the plug 24, however, provides a generally centered location for the fluid supply conduit 26, making it more difficult for the livestock to come into contact with the fluid supply conduit 26.

Figure 2:
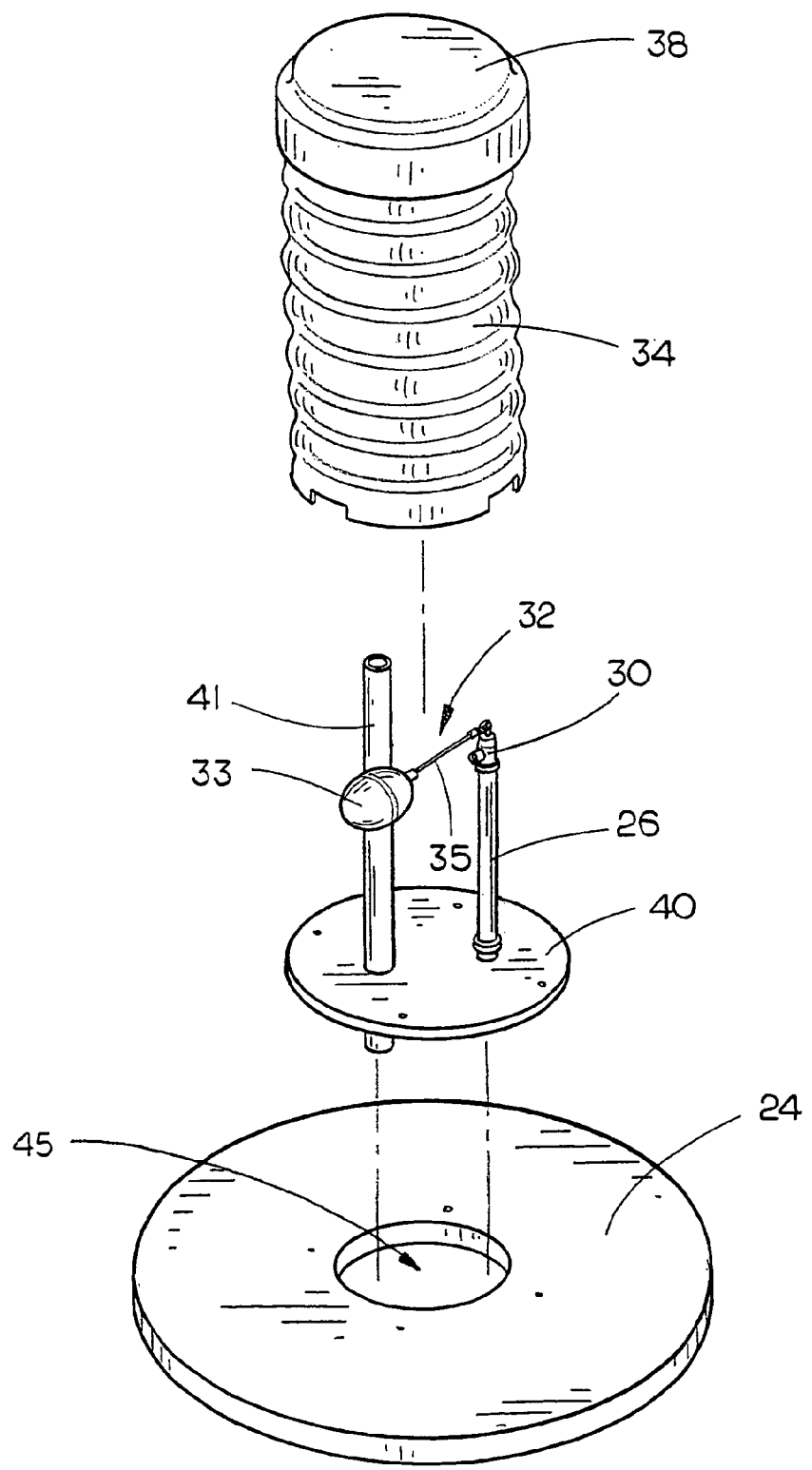
FIG. 2 is a partial exploded view of one embodiment of the automation components of the present invention.
Figure 3:
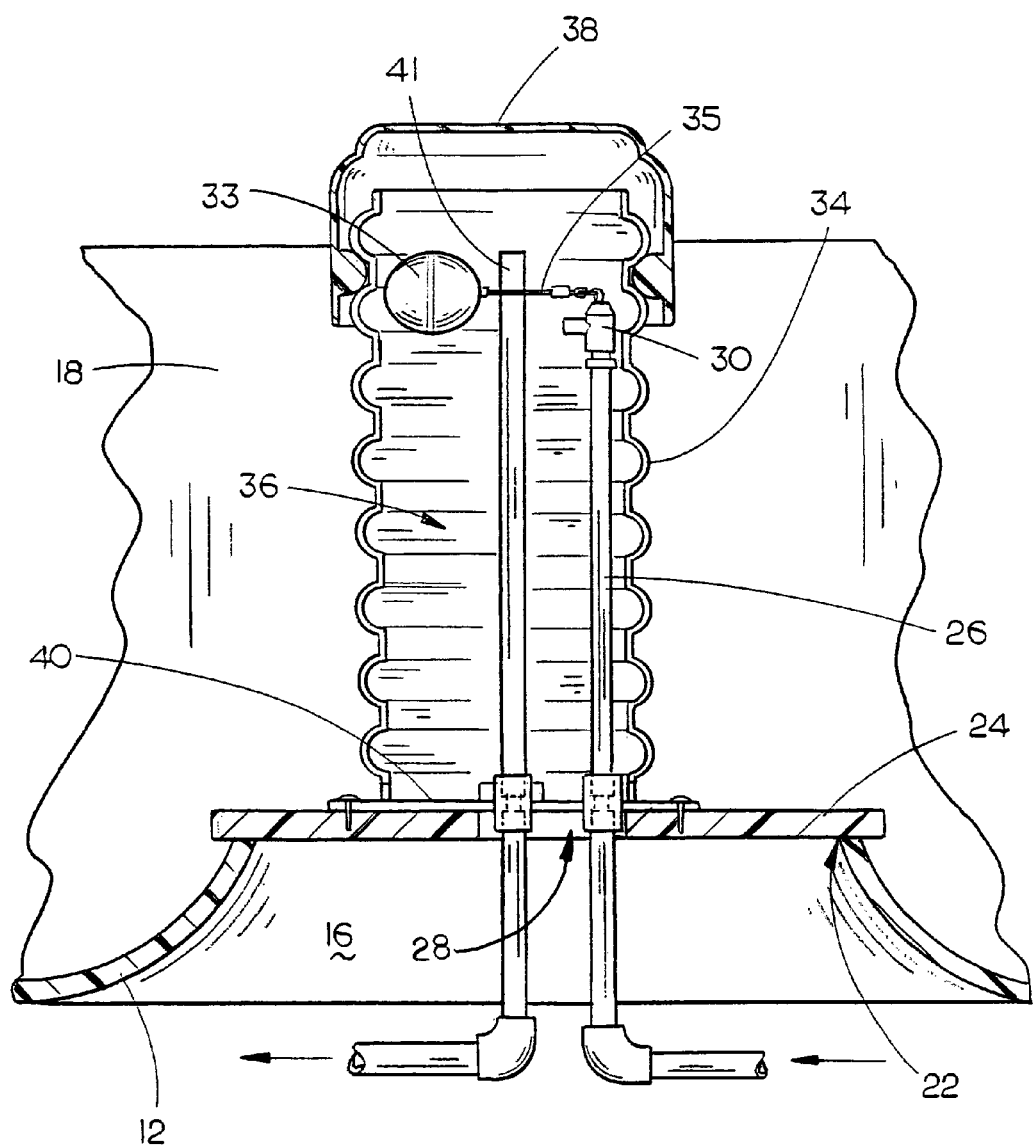
FIG. 3 is a partial cut-away view of one embodiment of the automation components of the present invention and one method of coupling the same to a trough of the present invention.
Figure 4:
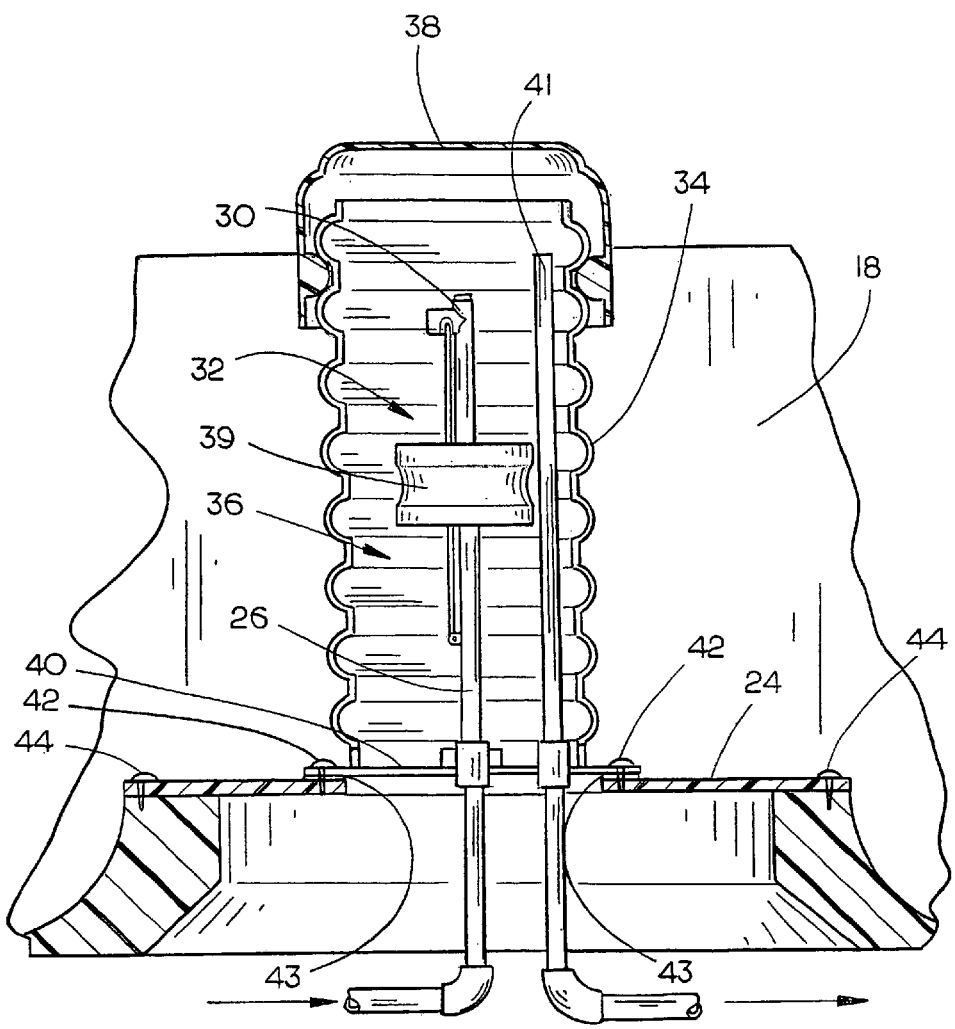
FIG. 4 is a partial cut-away view of the automation components of FIG. 2 and one method of coupling the same to a trough of the present invention.

A valve 30 is coupled to the terminal end of the fluid supply conduit 26. In a preferred embodiment, a float valve is used, such as the float valves depicted in FIGS. 2–4. However, other known valves could be interchanged with the float valve to achieve the desired regulation of water through the fluid supply conduit 26. A valve actuator 32, such as the ball float 33 depicted in FIGS. 2–4, is coupled with the valve 30. Where circumstances deem prudent, many different types of valve actuators could be incorporated with the valve 30. For example, a ball float 33 may be coupled to the float valve using a substantially rigid arm member 35 (FIGS. 2 and 3) or a substantially flexible cord member, depending on the type of float valve used. To conserve space, a vertically movable float 39 (FIG. 4) can be coupled with the valve 30 and the fluid supply conduit 26. Other actuators, such as electronic moisture sensors and the like, could be incorporated. Regardless of the type of actuator 32 or valve 30 used with the system, the principal function of the two will be to regulate the flow of the water from the fluid supply conduit 26 until a desired volume is attained. At that point, the actuator 32 should function to simply close the valve 30. It is preferred that the actuator be adjustable to alter the volume of fluid within the trough 10 as desired.

In a preferred embodiment, an inner wall 34 is coupled to the trough 10 so that it at least partially surrounds the valve 30 and valve actuator 32, forming a protective tower to further reduce the likelihood of contact between the fluid supply line 26, the valve 30, or the valve actuator 32 with the livestock. As depicted in FIGS. 3 and 5, the inner wall 34 is shaped to define an inner chamber 36, which should be sized and shaped to house the valve 30 and valve actuator 32 accordingly. Where desirable, an overflow conduit 41 may be positioned within the inner chamber 26 at a desired height from the base 12 or plug 24 so that the fluid within the cavity 20 will not overflow in the event that the valve 30 and/or valve actuator 32 fail. A removable cap 38 may be removably coupled to the inner wall 34 to further protect the structures positioned within the inner chamber 36, while permitting access for maintenance.

The inner wall 34 should be secured to the plug 24 (or other structural member from which it will depend) in a watertight fashion. As depicted in FIGS. 2, 3 and 5, the inner wall 34 may be secured to a water access cover 40, which can be fastened to the plug 24 over an optional access hole 45 formed within the plug 24. The type of fastener 42 used will depend upon the materials selected for the plug 24. However, in the example of a plastic member, stainless steel screws are an example of one type of appropriate fastener. To further guarantee a watertight seal, an O-ring 43 can be secured between the plug 24 and the water access cover 40 around the access opening 45. The plug 24, where a plastic or rubber material is used, can be secured to the base 12 adjacent the opening 22 by first applying a layer of sealant between the plug 24 and the base 12. The plug 24 can then be fastened to the base 12 using an appropriate fastener, such as the stainless steel screws 44. However, the type of fastener 44 used may change where the materials for the plug 24 and the base 12 require.

To substantially drain the volume of fluid from the cavity 20, a drain hole 46 should be formed within the base 12 or wall 18. A drain plug 48 should be provided to adequately seal the drain hole 46 when the trough 10 is in use. Press-fit, threadably-mated, and other drain plugs 48 are contemplated.

The design of the trough 10 is sufficiently flexible to accommodate additional structures and features. For example, the trough 10 may be supported above ground level by a base, which could be comprised of a second over-the-road tire, to provide an elevated drinking position for the livestock. Where a heat sink is desired in colder climates, the trough 10 is easily positioned above a hole in the ground, which is dug deeper than the frost line. One or more heat conduits could be inserted through the base 12 or plug 24 to direct the passage of heat from below the frost line, up through the hole in the ground, and through the heat conduits, forming a heat sink to substantially prevent the fluid within the cavity 20 from freezing.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A trough for livestock, comprising:
   a base, substantially comprised of a tire side wall, having upper and lower surfaces, a generally annular opening proximate a center portion of said base, and a peripheral edge portion;
   an outer wall, substantially comprised of a tire tread, extending upwardly from the peripheral edge portion of said base to form an open cavity;
   a fluid supply conduit extending through said opening formed within said base so that said fluid supply line is in fluid communication with said cavity to selectively supply a volume of fluid to said cavity;

valve means operatively connected to said fluid supply conduit for regulating the volume of fluid that enters said cavity from said fluid supply conduit;

valve actuator means operatively connected to said valve means for at least partially opening said valve means when the volume of fluid in said cavity is below a predetermined level; an access cover that covers the opening formed within said base and receives said fluid supply conduit and an overflow conduit that is positioned to drain excess fluid from said cavity; and an inner wall that forms a protective tower that is removably secured to said access cover, said protective tower and access cover defining an inner chamber that is in fluid communication with said cavity.

2. The trough of claim 1 further comprising an overflow conduit positioned to be in fluid communication with said cavity so that excess fluid drains from said cavity when the fluid volume exceeds a predetermined level.

3. The trough of claim 1 further comprising a drain opening and a drain closure means for selectively emptying the volume of fluid from within said cavity.

4. The trough of claim 1 further comprising an inner wall that forms a protective tower having an inner chamber that is in fluid communication with said cavity and a cap that is removably coupled with said inner wall at a position that permits said cap to selectively cover an open upper end portion of said protective tower and provide easy access to said inner chamber.

5. The trough of claim 4 wherein said valve means and said valve actuator means are disposed within the inner chamber of said protective tower.

6. The trough of claim 5 further comprising an overflow conduit extending through the opening formed within said base so that said overflow conduit is disposed within the inner chamber of said protective tower to drain excess fluid from said cavity.

7. The trough of claim 1 wherein said base and said outer wall are integrally formed with one another and are formed by providing a mobile vehicle tire having at least a portion removed from a side wall of said tire to define an upper opening for the trough.

8. The trough of claim 7 wherein said base is comprised of a tire sidewall, having a generally concave upper surface.

9. The trough of claim 8 further comprising a plug means being selectively coupled to said base adjacent said opening to substantially prevent fluid from unintentionally traversing said opening.

10. The trough of claim 9 further comprising an overflow conduit extending upwardly through said plug and into said cavity so that excess fluid drains from said cavity when the volume of fluid exceeds a predetermined level.

11. The trough of claim 10 further comprising an access opening formed through said plug that receives said fluid supply conduit and said overflow conduit.

12. The trough of claim 11 further comprising an access cover that is secured to said plug around said access opening to substantially prevent the unintentional passage of fluid through said access opening.

13. The trough of claim 12 further comprising an inner wall that forms a protective tower that extends upwardly from said access cover and defines an inner chamber that is in open fluid communication with said cavity.

14. The trough of claim 13 further comprising a cap that is removably coupled to an upper end portion of said protective tower to selectively cover an opening that provides easy access to said inner chamber.

15. The trough of claim 14 wherein said valve means and said valve actuator means are disposed within the inner chamber of said protective tower.

16. The trough of claim 15 wherein said overflow conduit is disposed within the inner chamber of said protective tower.

17. The trough of claim 16 further comprising a drain opening and a drain closure means for selectively emptying the volume of fluid from within said cavity.

18. The trough of claim 17 wherein said plug means is comprised of polyethylene.

19. A trough for livestock, comprising:

a base having upper and lower surfaces and a peripheral edge portion;

an outer wall extending upwardly from the peripheral edge portion of said base to form an open cavity;

an inner wall that forms a protective tower having an inner chamber that is in fluid communication with said cavity;

an overflow conduit extending through the opening formed within said base so that said overflow conduit is disposed within the inner chamber of said protective tower to drain excess fluid from said cavity;

a fluid supply conduit extending through an opening formed within said base so that said fluid supply line is in fluid communication with said cavity to selectively supply a volume of clued to said cavity;

an access cover that covers the opening formed within said base and receives said fluid supply conduit and said overflow conduit; said protective tower being removably secured to said access cover;

valve means operatively connected to said fluid supply conduit for regulating the volume of fluid that enters said cavity from said fluid supply conduit; and valve actuator means operatively connected to said valve means for at least partially opening said valve means when the volume of fluid in said cavity is below a predetermined level;

said valve means and said valve actuator means being disposed within the inner chamber of said protective tower.

\* \* \* \* \*